United States Patent [19]
Barbulescu

[11] Patent Number: 5,908,563
[45] Date of Patent: Jun. 1, 1999

[54] SIDE BORE ELECTRODE RETENTION DEVICE FOR ELECTRIC DISCHARGE MACHINING

[75] Inventor: George Barbulescu, Ann Arbor, Mich.

[73] Assignee: Ann Arbor Machine Company, Chelsea, Mich.

[21] Appl. No.: 08/912,265

[22] Filed: Aug. 18, 1997

[51] Int. Cl.⁶ .............................. B23H 1/00; B23H 7/26
[52] U.S. Cl. ........................ 219/69.15; 219/69.2
[58] Field of Search .................... 219/69.15, 69.2

[56] References Cited

U.S. PATENT DOCUMENTS

| | | | |
|---|---|---|---|
| 3,939,322 | 2/1976 | Bonga | 219/69.15 |
| 4,088,032 | 5/1978 | O'Connor | 219/69.15 |
| 4,916,282 | 4/1990 | Chamming's et al. | 219/69.15 |
| 4,948,933 | 8/1990 | Thompson | 219/69.2 |
| 5,086,201 | 2/1992 | Grypczynski et al. | 219/69.2 |
| 5,324,907 | 6/1994 | Wallace | 219/69.2 |
| 5,543,599 | 8/1996 | Cole et al. | 219/69.2 |
| 5,818,006 | 10/1998 | Habel et al. | 219/69.2 |

FOREIGN PATENT DOCUMENTS

| | | | |
|---|---|---|---|
| 62-277226 | 12/1987 | Japan | 219/69.15 |
| 3-270824 | 12/1991 | Japan | 219/69.15 |

*Primary Examiner*—Geoffrey S. Evans
*Attorney, Agent, or Firm*—Harness, Dickey & Pierce, P.L.C.

[57] ABSTRACT

An electric discharge machine side bore head used for machining in a generally transverse direction within a cavity formed in a workpiece. The head retaining an electrode having a primary axis oriented generally perpendicular to the surface which is to be machined. The side bore head includes an electrode holder, an electric contact providing electric current to the electrode holder, and a device for releasably retaining the electrode near one end of the electrode holder. The primary axis of the electrode is oriented generally perpendicular to a longitudinal axis of the electrode holder.

10 Claims, 6 Drawing Sheets

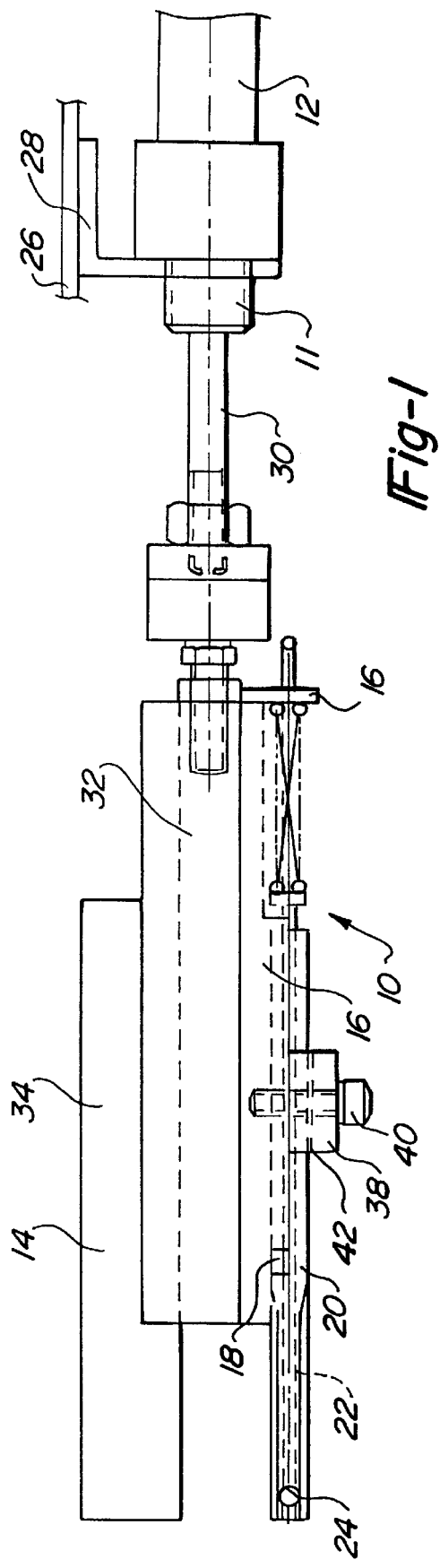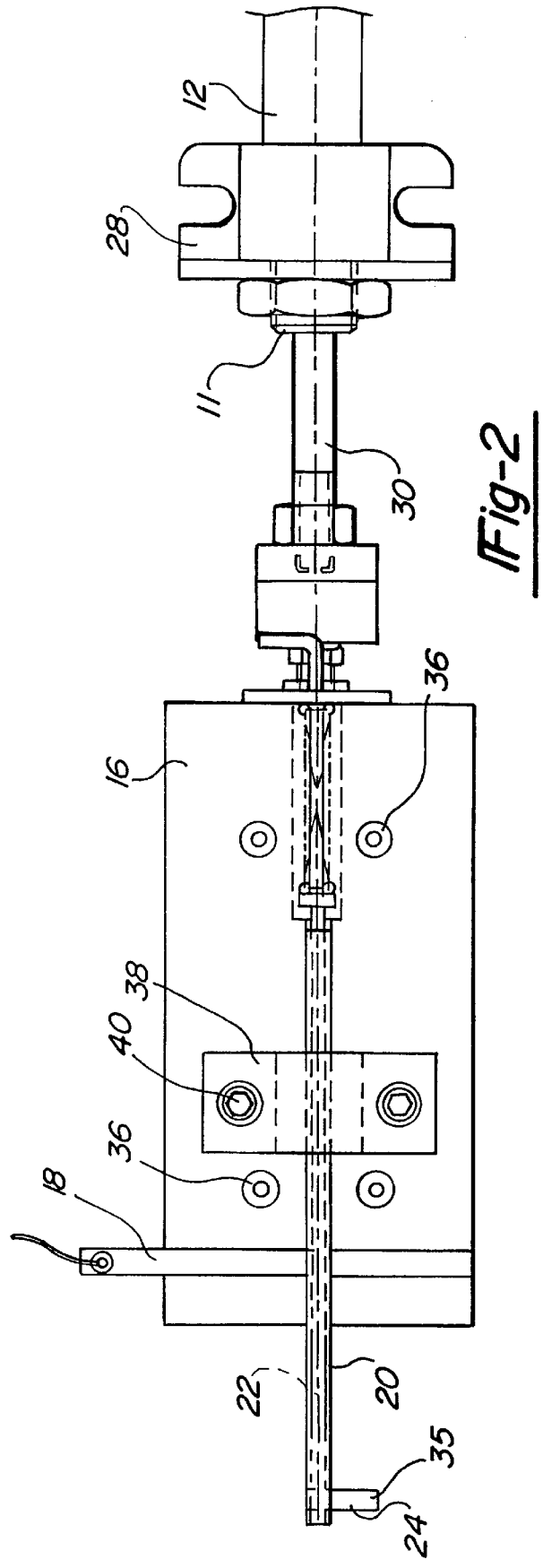

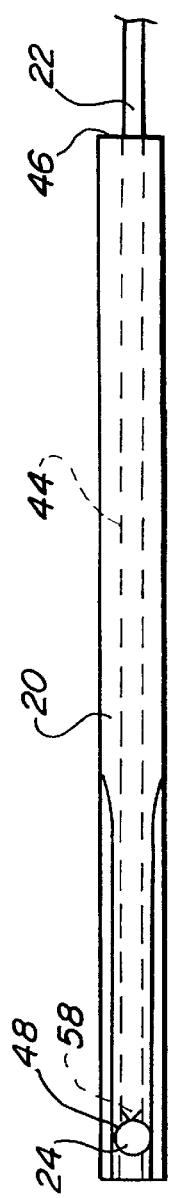
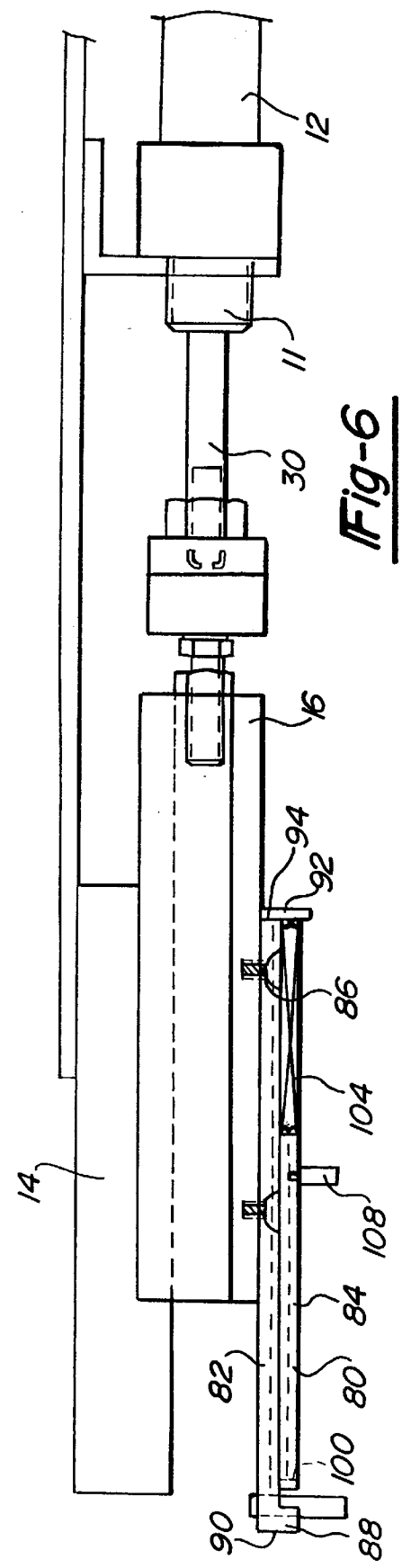

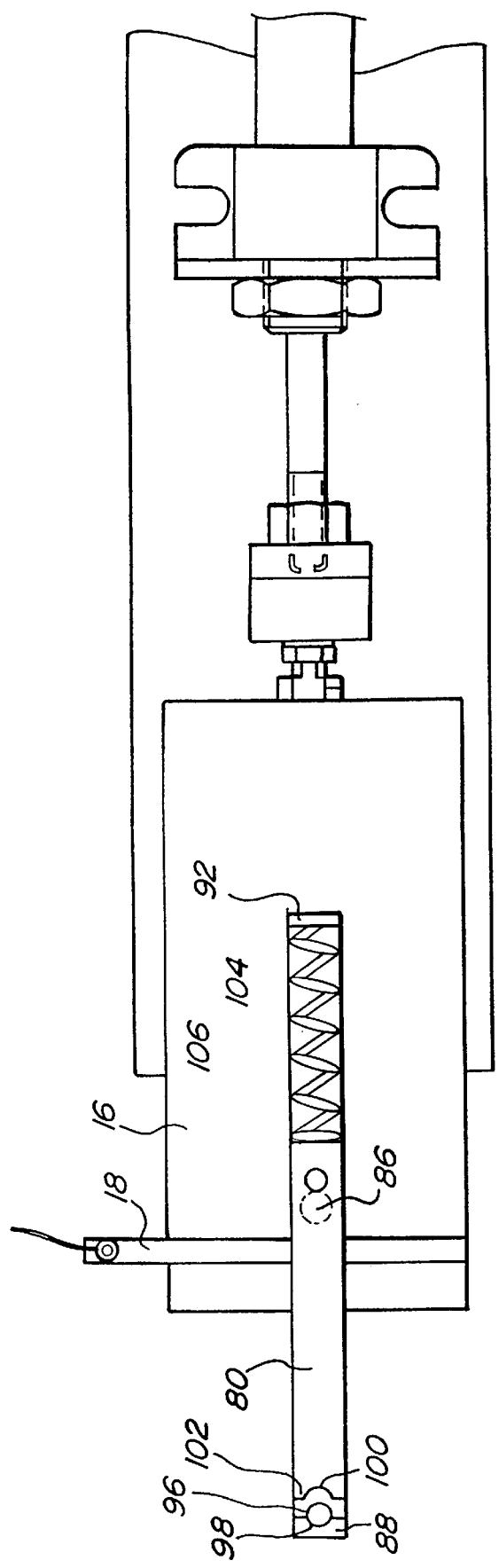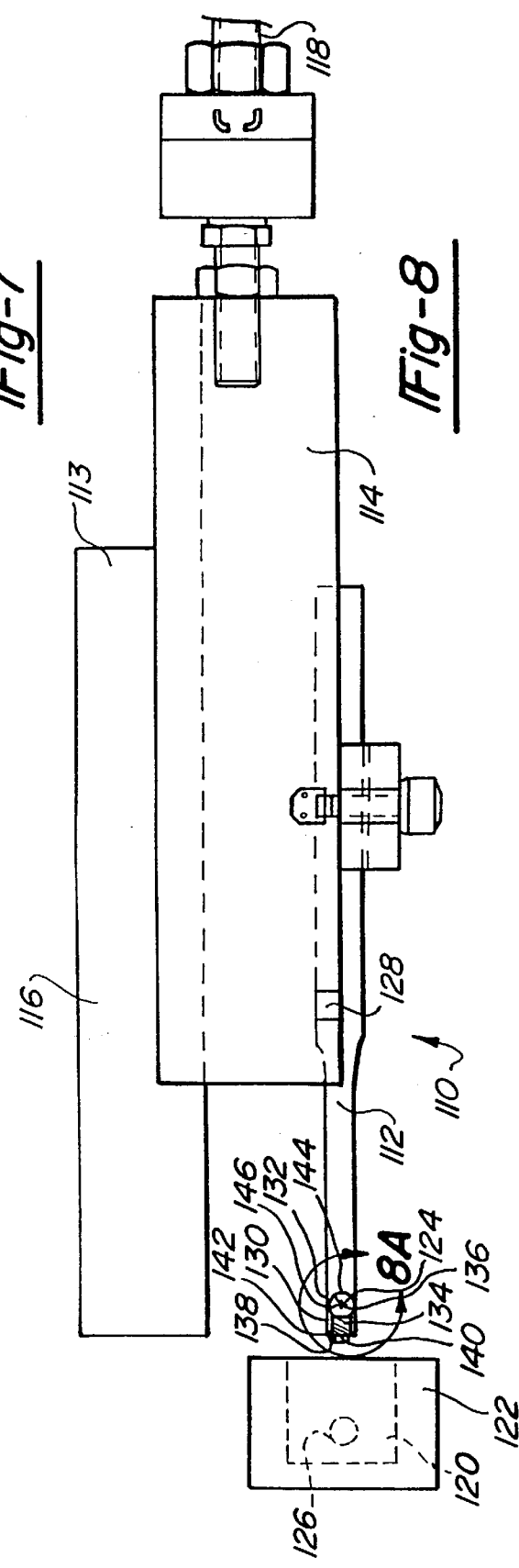

SIDE BORE ELECTRODE RETENTION DEVICE FOR ELECTRIC DISCHARGE MACHINING

BACKGROUND OF THE INVENTION

1. Technical Field

This invention generally relates to electric discharge machining (EDM) and, more particularly, to an electrode retention device for use with an electric discharge machine during the formation of a side bore.

2. Discussion

In general, the electric discharge machining (EDM) process is based on the principle of erosion of the metal workpiece by spark discharges. The spark is an electric discharge through the space between the two charged elements, the first being the workpiece and the second being an electrode. The workpiece and the electrode are placed within a dielectric fluid. A direct current is applied to the system which typically includes a capacitor in parallel with the spark gap between the two elements. At low voltages the dielectric fluid acts as an insulator, but as the potential difference between the electrode and the workpiece increases there is a dielectric breakdown in the fluid and a spark passes through the spark gap. The spark causes the vaporization of some of the workpiece material as well as some of the material of the electrode. Following a spark discharge, deionization of the dielectric fluid reestablishes the insulation properties and the current again drops to near zero. The capacitor is then charged again and the process begins over. This process can be repeated at a very high rate (200–500,000 cycles per second) with the metal removal rate being controlled by the current density or average current in the discharge circuit. Typically the higher the current density the rougher the surface finish but more material is removed.

At times it is desirable to EDM a bore which is generally parallel to the primary work surface of the workpiece. An example of this condition is when a connecting passage must be provided between several deep bores already machined into the workpiece. One method of producing the connecting passage is to rotate the workpiece, or the tool, and machine the passage from the outer surface of the workpiece which is generally perpendicular to the first surface of the workpiece. The tool is positioned such that the passage passes from the outer surface through the bores which are to be connected. A plug is then inserted into a portion of the connecting passage which extends from the outer surface to the first passage which is intersected thereby sealing the passage from the outer surface of the workpiece.

There are many limitations and disadvantages to this method of providing a connecting passage. First, if there are other bores between the outer surface of the workpiece and the bores which are to be connected this method can generally not be used or if used requires the insertion of multiple plugs. Second, the use of plugs creates areas where leaks can form, particularly if high pressure air or fluid is to be used. As such, there is a need within the industry for a simple, cost effective method and apparatus to create passages which extend from within a cavity or bore while not creating unwanted passages to the outside surface of a workpiece.

SUMMARY OF THE INVENTION

In accordance with the teachings of the present invention, there is disclosed an EDM side bore head having an electrode retention device for cutting side bore passages using electric discharge machining. Disclosed is a method and apparatus for providing a generally transverse side bored connecting passage using an EDM tool holder having an electrode projecting generally perpendicular to the holder. The tool holder is advanced within a passage or cavity and the holder and electrode are then moved in a cutting direction such that a side bore passage is cut or machined through a wall of the passage or cavity. This has the advantage of not requiring a plug to the outer surface as described in the prior methods of cutting such a side bore passage. By avoiding having a plug to the outer surface, there is an increase in reliability since the plugs can leak or become loose over time. There is also a reduction in labor time since the additional step of filling the unwanted portion of the connecting passage is not required.

Typically, the electrode must be replaced after each side bore passage is formed because the electrode itself is partially sacrificed, as explained above. If the passage is relatively close in length to the diameter of the largest passage which is being connected, the electrode will not be long enough to cut from one passage to the next after the electrode has sacrificed material while cutting the prior connecting passage.

The electrode used in the above described process is secured to the EDM tool holder by a retaining device. The retaining device is used to ensure a solid electrical contact between the electrode and the electrically conductive tool holder. Due to the high current used in EDM, the electrical contact must be secure and must be over a sufficiently large surface area between the electrode and the holder such that the spark which is created during machining occurs at the tip of the electrode and not at an interface between the components of the EDM machine. The retaining device also secures the electrode from movement, although little or no forces are exerted on the electrode since physical contact is not made between the electrode tip and the workpiece. If physical contact is made between the electrode and the workpiece, an electrical short is created between the workpiece and the electrode and cutting is not achieved.

The present invention further discloses retention devices which simplify the process of replacing the electrode. Several of the disclosed retention devices are particularly adapted to automated processes of replacing the spent electrodes with new electrodes.

BRIEF DESCRIPTION OF THE DRAWINGS

The various advantages of the present invention will become apparent to one skilled in the art upon reading the following specification and by reference to the drawings which include:

FIG. 1 is a side view of an EDM side bore head made in accordance with the teachings of the present invention;

FIG. 2 is a plan view of the EDM side bore head shown in FIG. 1;

FIG. 5 is a cross-sectional view taken along line 5—5 in FIG. 2;

FIG. 6 is a side view of an alternate EDM side bore head made in accordance with the teachings of the present invention;

FIG. 7 is a plan view of the alternate embodiment shown in FIG. 6;

FIG. 8 is a sectional view of an alternate embodiment of the present invention;

DETAILED DESCRIPTION OF THE PREFERRED EMBODIMENTS

The following description of the preferred embodiments is merely exemplary in nature and is in no way intended to limit the invention or its application or uses.

Figure 3:
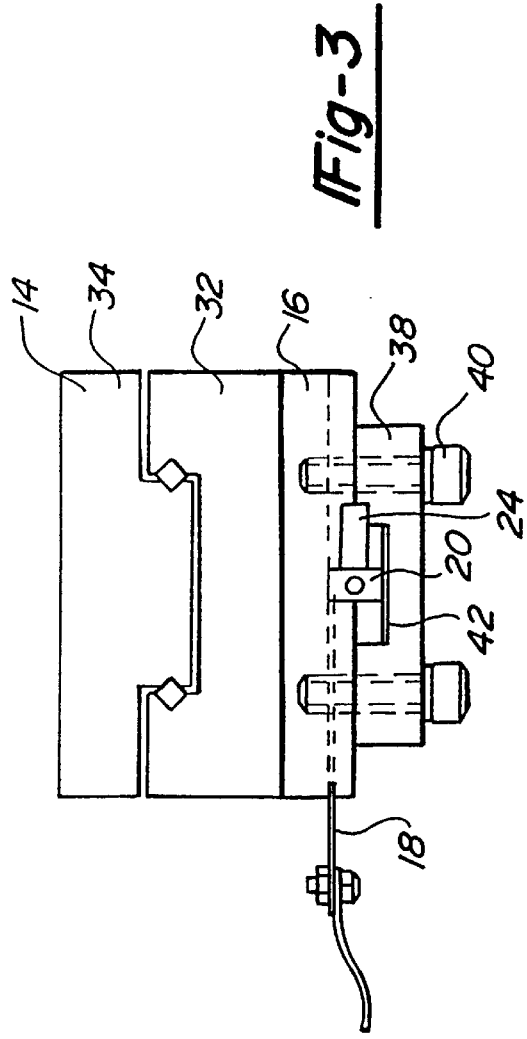
FIG. 3 is a end view of the EDM side bore head shown in FIG. 1.

Referring to FIGS. 1–3, there is shown a preferred embodiment of an EDM side bore head, generally at 10, made in accordance with the teachings of the present invention. As shown, side bore head 10 includes an actuator 11, a slide block system 14, a base plate 16, an electrical contact 18, a conductive electrode holder 20, an electrode holder push rod 22, and a replaceable electrode 24.

As shown, actuator 11 is an air cylinder 12 secured to a connector portion 26 of the EDM machine by an attachment bracket 28. An air piston 30 extends from air cylinder 12 to advance or retract a movable slide block 32 of slide block system 14. Movable slide block 32 moves axially relative to a fixed slide block 34 which is also attached to the connector portion 26 of the EDM machine. Portion 26 and block 34 are both attached to the same EDM slide. Connector portion 26 and block 34 are attached to a traditional EDM slide mechanism (not shown) which moves the cutting tip 35 of electrode 24 toward or away from the material of the workpiece which is to be removed to form the connector passage. In operation, the air cylinder 12 advances piston 30 such that the electrode holder 20 travels into a bore or cavity previously formed in the workpiece. Once the tip 35 of the electrode 24 is positioned at the proper position within the bore, the tip 35 is advanced toward the inner surface of the bore by travel of the EDM slide mechanism (not shown). The control system of the EDM machine controls the advancement of the cutting tip as in any other conventional EDM process. The control system can be one of a wide variety of systems currently in use or any system which is later developed to serve the same purpose as will be understood by one skilled in the art. Further, while an air cylinder is shown in the preferred embodiment, one skilled in the art will readily recognize that other actuator means, such as a stepper motor, or servo system, can be used to advance the electrode holder 20 within the previously formed bore. Also, it will be recognized by one skilled in the art that the EDM machine incorporating the side bore head 10 of the present invention can be one of a variety of forms now known or a later developed system recognized as performing the same or similar operations.

Base plate 16 is secured to movable slide block 32 by base plate fasteners 36. Base plate 16 is made of a non-conductive insulating material such that the electric current supplied by electric contact 18 does not charge the entire side bore head 10 or the remainder of the EDM machine. Base plate 16 of the preferred embodiment is preferably made of green glass (also known as G10 material), although other materials having similar electrical and dimensional stability properties can be readily utilized. An electrode holder retainer 38 is mounted to base plate 16 by retainer fasteners 40. Retainer 38 may have a rubber insert 42 to protect electrode holder 20 from damage caused by the clamping force of retainer 38. The rubber insert 42 can also act as an electric insulator if desired or required. Also located on base plate 16 is electrical contact 18 which in the preferred embodiment is a laminated beryllium copper strip. Each strip of contact 18 is preferably pre-curved such that when installed in base plate 16 the electric contact 18 is biased toward electrode holder 20 to improve the electrical contact therebetween. Other conductive materials can be used to provide the electrical current to electrode holder 20 as can other methods of providing the electrical connection to holder 20. For example, a direct electrical connection can be made by a wire to electrode holder 20, although the system used in the preferred embodiment speeds the change over process when a new or different electrode holder is installed. Further, a spring biased bushing system (not shown) can be used in much the same fashion as bushings are used in electric motors.

Figure 4:
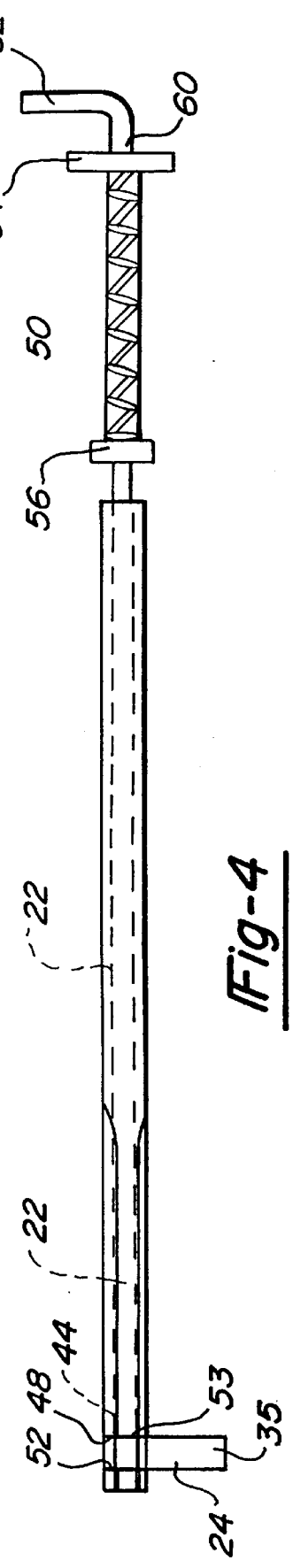
FIG. 4 is a cross-sectional view taken along line 4—4 in FIG. 1.

Referring to FIGS. 4 and 5, there is shown a preferred embodiment of the electrode holder 20 and holder push rod 22. As shown, conductive electrode holder 20 is a generally cylindrical device preferably made of silicon carbide or other similar material. Holder 20 provides an axial bore 44 in which push rod 22 is inserted from one end 46. Holder 20 also provides an electrode retaining aperture 48 near another end of holder 20. Retaining aperture 48 is slightly oversized compared to the relative size of the electrode 24 to be used.

Aperture 48 intersects axial bore 44 such that when push rod 22 is located in bore 44, contact is made between rod 22 and electrode 24 when electrode 24 is inserted within aperture 48. A spring, or other biasing means, 50 exerts an axial force upon rod 22 sufficient to force electrode 24 securely into contact with an interior surface 52 of aperture 48 which is generally opposite the intersection 53 between bore 44 and aperture 48. Spring 50 is located between a reaction plate 54 attached to base plate 16, and a collar 56 attached to or formed on push rod 22. Push rod 22 is preferably made of tungsten or other similar material having a relatively high heat resistance. Push rod 22 need not be, although it may be, made of a conductive material since the electrical current flows from contact 18 to the conductive electrode holder 20. While a first end 58 of push rod 22 contacts electrode 24, a second end 60 extends beyond bore 44 and through spring 50. Second end 60 provides a grip portion 62 which allows an operator or an automated system to overcome the biasing force of spring 50 and release electrode 24 from its location within aperture 48. A new electrode can then be quickly and easily inserted into aperture 48 and the grip portion 62 released, thereby allowing for fast and efficient changeover times when a new electrode is required.

The contact between electrode 24 and the interior surface 52 of aperture 48 is important to provide sufficient surface contact such that the large current used in the EDM can flow from the electrically conductive electrode holder 20 to the electrode 24. As previously discussed, the electrical contact must be secure and over a sufficiently large surface area between electrode 24 and holder 20 such that the spark which is created during machining occurs at the cutting tip 35 of electrode 24 and not at an interface between the components of the EDM machine.

An alternate embodiment of the present invention is shown in FIGS. 6 and 7. The present embodiment utilizes the same actuator 11 having air cylinder 12 and piston 30, slide block system 14, and base plate 16, but incorporates an electrode holder 80 having a fixed holder 82 and a movable holder 84. As shown, fixed holder 82 is secured to base plate 16 by retainers 86. Movable holder 84 is slidably mated to fixed holder 82 by interlocking channel devices such as slidable dove tail joints.

Fixed holder 82 includes an upstanding portion 88 at a first end 90 and provides for a reaction plate 92 at a second end 94. An aperture 96 is formed in fixed holder 82 near first end 93 such that a semi-circular notch 98 of aperture 96 is formed in upstanding portion 88. A generally complementary semi-circular notch 100 is formed in the first end 102 of movable holder 84.

In use, a spring 104 is inserted between a second end 106 of movable holder 84 and reaction plate 92 such that movable holder 84 is biased toward upstanding portion 88 of fixed holder 82. A grip 108 is secured to movable holder 84 such that the biasing force of spring 104 can be overcome by an operator or by an automated system when an electrode 24 is to be removed or inserted. Electrical contact 18 is inserted into base plate 16 as in the first embodiment and provides electrical current to fixed holder 82.

It will be readily appreciated by those skilled in the art that alternate systems can be used to bias movable holder 84 toward upstanding portion 88. One particular example within the teachings of the present invention includes providing a gear rack attached to or formed in a surface of movable holder 84 and having a corresponding stepper motor and gear which engages the rack. As the electrode 24 is inserted into the aperture, the stepper motor would rotate in a first direction thereby moving the movable holder 84 toward the upstanding portion 88 and securing the electrode and providing for proper electrical contact between the surface of the aperture in the fixed holder and the electrode. As the electrode is worn away and needs replacing, the stepper motor would rotate in a second direction and move the movable holder 84 away from the upstanding portion 88 thereby releasing the electrode.

Figure 8A:
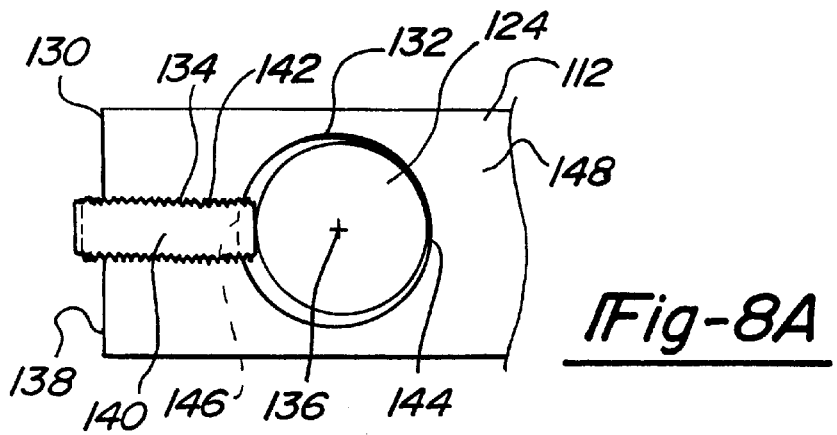
FIG. 8A is a detailed sectional view of the portion indicated in FIG. 8.

Another alternate embodiment of an EDM side bore head made in accordance with the teachings of the present invention is shown in FIGS. 8 and 8A, and is generally indicated at 110. Side bore head 110 includes an electrically conductive electrode holder 112 which is mounted to a slide block system 113. Electrode holder 112 is mounted to a movable slide block 114 of system 113 and slidably engages a fixed slide block 116 such that an actuator 118 can advance or retract movable slide block 114 and holder 112 into or out of an existing bore or cavity 120 within workpiece 122. Actuator 118 moves holder 112 into the cavity 120 until electrode 124 is aligned with the location where the side bore passage 126 is to be machined.

Movable slide block 114 preferably provides an electrical contact 128 which is in contact with electrode holder 112. Electrode holder 112 is preferably made of a conductive material such as silicon carbide or other conductive ceramic although a wide variety of conductive material are known and can be used with equal results.

Near one end 130 of holder 112 an electrode retaining aperture 132 is provided which receives electrode 124 therein. A bore 134 is provided in holder 112 which intersects with aperture 132 and extends generally perpendicular to a central longitudinal axis 136 of aperture 132.

In the present embodiment of the invention, bore 134 is threaded and intersects with an outer surface 138 of holder 112. A screw 140 threadingly engages internal threads 142 within bore 134. As such, when electrode 124 is inserted in electrode aperture 132 the screw 140 can be turned in a first direction and advance into forcible contact with electrode 124. Electrode 124 is biased by screw 140 into contact with an interior surface 144 of aperture 132. Surface 144 is generally opposite the intersection 146 between aperture 132 and bore 134.

The contact between electrode 124 and surface 144 provides a solid electrical connection between electrode 124 and conductive electrode holder 112 such that the electric current provided by electrical contact 128 passes from holder 112 to electrode 124 and is discharged at cutting tip 148 of electrode 124 during machining.

When electrode 124 is worn because of sacrificing material during machining, the screw 140 can be rotated in a second direction, thereby disengaging electrode 124, and the electrode 124 can be removed and replaced with a new electrode.

Figure 9A:
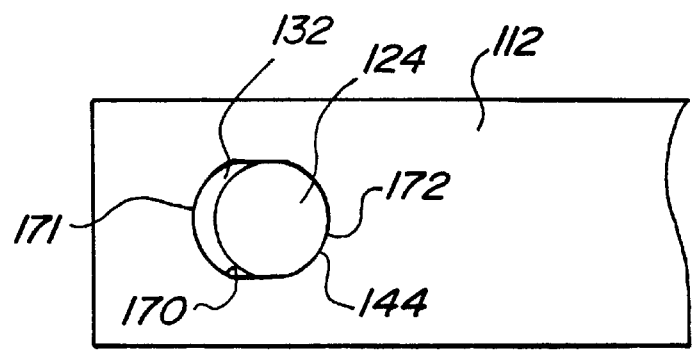
FIGS. 9a–c are plan views of various electrode retention apertures which can be utilized in a side bore head made in accordance with the teachings of the present invention.
Figure 9B:
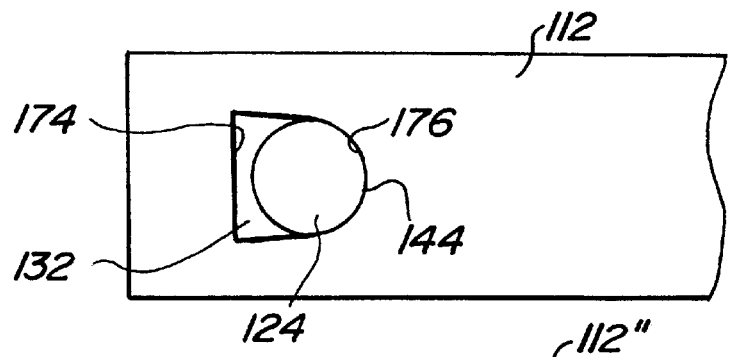
Figure 9C:
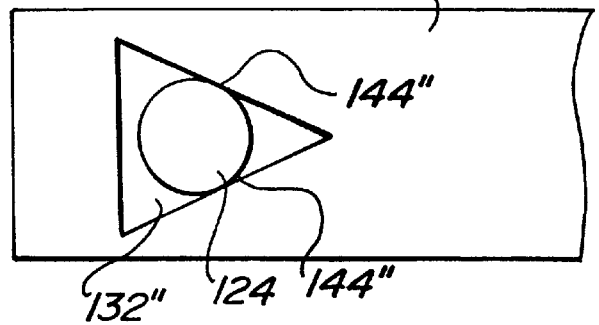

As shown in FIGS. 9a–c, the electrode aperture 132, used with any of the embodiments disclosed herein, can take a variety of forms. In addition to the generally circular shape (shown for example in FIG. 11) an elongated slot 170 having circular ends 171 and 172 can be utilized as shown in FIG. 9a. The circular ends generally have the same radius as the electrode 124 which is to be used or has a complimentary surface shape if a non-circular electrode is to be used. Also, a flat side 174 may be utilized in conjunction with an opposite side 176 which coordinates with the shape of the electrode 124 used in a particular application, as shown in 9b. Further, as shown in FIG. 9c, a triangular aperture 132" can be utilized, particularly when the same holder 112" is intended to secure different sized or shaped electrodes 124. En this particular aperture 132", there are several discrete contact surfaces 144" as opposed to a generally continues contact surface for the other apertures shown.

Figure 10:
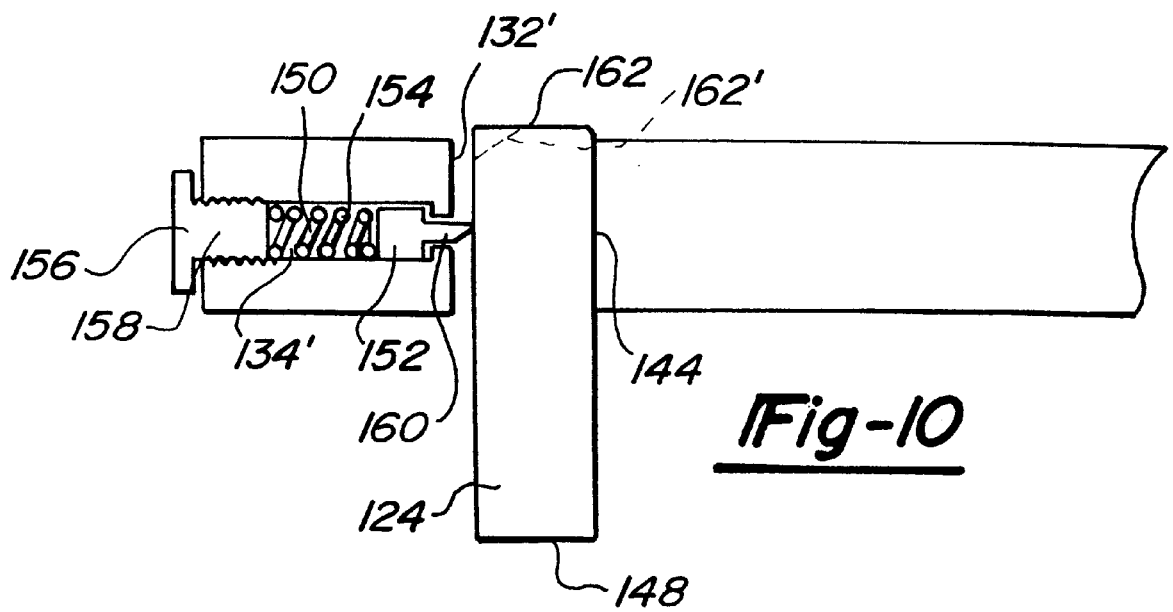
FIG. 10 is a sectional side view of an alternate embodiment of the present invention.
Figure 11:
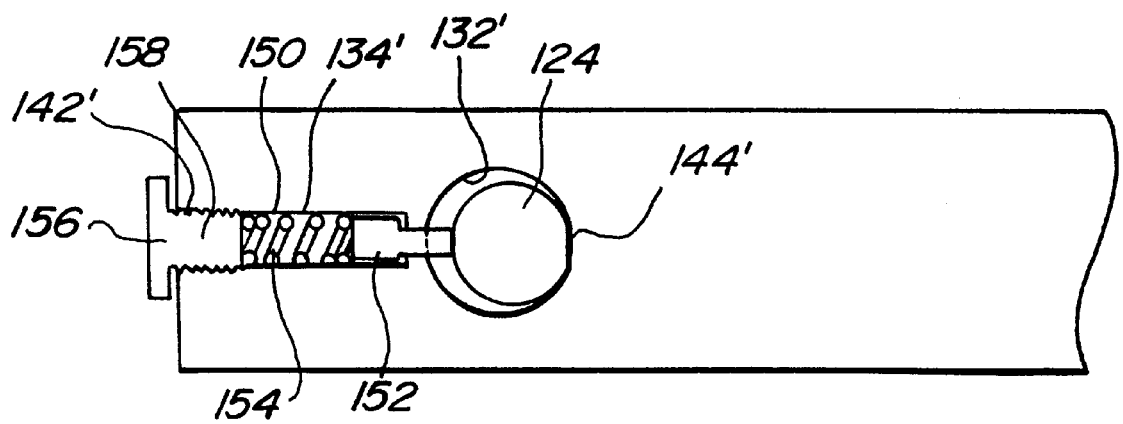
FIG. 11 is a plan view of the alternate embodiment shown in FIG. 10.

As shown in FIGS. 10 and 11, a spring biasing means 150 can be utilized within bore 134' to provide the forcible contact which urges electrode 124' into contact with surface 144' of aperture 132'. A retaining device 152 is biased by a spring 154 toward surface 144' of electrode aperture 132'. Device 152 and spring 154 are secured within bore 134' by a stop device 156. Stop device 156 is shown to be a threaded bolt 158 which threadingly engages internal threads 142' within bore 134'.

An angled lead surface 160 can be formed on retaining device 152 such that as electrode 124' is inserted within electrode aperture 132', device 152 overcomes the biasing force created by spring 154 and allows electrode 124' to be installed. Spring 154 provides sufficient force to securely force electrode 124' into contact with opposite surface 144' and make electrical contact therewith. When electrode 124' is worn from machining, a new electrode can be aligned with the tip 148 of the old electrode and force the old electrode out of aperture 132'. It is preferable to insert the rear end 162 (opposite tip 148) of electrode 124' into the aperture 132' first so that the shape of the cutting tip 148 is not distorted by the contact with device 152.

While a tapered lead is shown on retaining device 152, one skilled in the art will readily recognize that a spherical ball end or other shapes which provide a smooth entry for electrode 124' could be used with equal result. Further, retaining device 152 can have a non-tapered end and the rear end 162' of electrode 124' can provide a curved or angled lead in surface.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. An Electric Discharge Machine head used for machining in a generally transverse direction within a cavity formed in a workpiece, the head being a side bore head which retains an electrode having a primary axis oriented generally perpendicular to the surface which is to be machined, the side bore head comprising:

an electrode holder having a longitudinal axis;

an electric contact providing electric current to said electrode holder;

means for releasably retaining the electrode near a first end of said electrode holder, the primary axis of the electrode being generally perpendicular to said longitudinal axis, wherein said electrode holder is advanceable in the direction of said longitudinal axis within the cavity of the workpiece to a cutting position where the side bore head is advanceable in the direction of the primary axis of the electrode such that the electrode machines the workpiece in the generally transverse direction.

2. The side bore head of claim 1 further comprising a means for advancing and retracting said side bore head in the direction of said longitudinal axis of said electrode holder.

3. The side bore head of claim 1 wherein said electrode holder further provides:

an electrode retaining aperture for receiving the electrode, said retaining aperture having an aperture axis parallel to the primary axis of the electrode;

a bore generally perpendicular to said aperture axis and extending from said electrode retaining aperture, wherein said means for releasably retaining the electrode is slidably mounted within said bore such that a first end of said retaining means extends within said electrode retaining aperture and contacts the electrode when the electrode is inserted within said retaining aperture.

4. The side bore head of claim 3 wherein said retaining means is further comprised of:

a push rod having a first end, said push rod being inserted within said bore; and means for biasing said push rod toward said electrode such that said first end of said push rod forcibly contacts the electrode thereby forcing the electrode into contact with said electrode holder such that electrical contact is provided between the electrode and said electrode holder.

5. The side bore head of claim 4 wherein an extended portion of said push rod extends beyond said bore, said biasing means acting on said extended portion of said push rod to urge said push rod into forcible contact with the electrode.

6. The side bore head of claim 1 wherein said electrode holder is further comprised of:

a fixed holder having an electrode retaining aperture;

a movable holder slidably mated with said fixed holder;

means for biasing said movable holder toward the electrode received in said electrode receiving aperture, such that said movable holder forces the electrode into contact with said retaining aperture whereby electrical contact is provided between said fixed holder and the electrode.

7. The side bore head of claim 6 wherein said fixed holder further includes an upstanding portion at a first end, at least a portion of said electrode retaining aperture intersecting said upstanding portion, said movable holder having a generally complementary portion of said retaining aperture formed in a contact end, whereby said contact end of said movable holder is biased into forcible contact with the electrode and urges the electrode into electrical contact with said fixed holder.

8. An Electric Discharge Machine side bore head used for machining in a generally transverse direction within a cavity formed in a workpiece, the side bore head retaining an electrode having a primary axis oriented generally perpendicular to the surface which is to be machined, the side bore head comprising:

an electrically conductive electrode holder having a longitudinal axis, said holder having an electrode retaining aperture at a first end for receiving the electrode, and having an axial bore parallel to said longitudinal axis, said axial bore having a first end intersecting said retaining aperture;

an electric contact providing electric current to said electrode holder;

a push rod slidably inserted within said axial bore;

means for biasing said push rod toward said first end of said electrode holder such that when said electrode is received within said retaining aperture said push rod forcibly contacts and retains said electrode, thereby forcing said electrode into contact with a surface of said retaining aperture generally opposite said intersection between said first end of said axial bore and said retaining aperture.

9. The side bore head of claim 8 wherein said biasing means can selectively be overcome such that said push rod is retracted from contact with the electrode, thereby allowing the electrode to be removed and replaced as required.

10. The side bore head of claim 9 wherein said push rod extends beyond a second end of said axial bore and providing a grip portion for urging said push rod to overcome said biasing means.

* * * * *

UNITED STATES PATENT AND TRADEMARK OFFICE
CERTIFICATE OF CORRECTION

PATENT NO. : 5,908,563
DATED : June 1, 1999
INVENTOR(S) : Barbulescu, George

It is certified that error appears in the above-indentified patent and that said Letters Patent is hereby corrected as shown below:

Column 5, Line 9, "93" should read --90--.

Signed and Sealed this

Ninth Day of November, 1999

Attest:

Q. TODD DICKINSON

*Attesting Officer*  *Acting Commissioner of Patents and Trademarks*